(12) United States Patent
Behede et al.

(10) Patent No.: US 11,983,187 B2
(45) Date of Patent: May 14, 2024

(54) GLOBAL STATUS MONITORING FOR OPEN DATA PLATFORM

(71) Applicant: Schlumberger Technology Corporation, Sugar Land, TX (US)

(72) Inventors: Paresh Behede, Pune (IN); Todd Dixon, Pune (IN); Shreyas Mehta, Houston, TX (US); Geeta Ramdas, Pune (IN); Julian Jose Moreno, Katy, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 24 days.

(21) Appl. No.: 18/048,904

(22) Filed: Oct. 24, 2022

(65) Prior Publication Data

US 2024/0070161 A1 Feb. 29, 2024

(30) Foreign Application Priority Data

Aug. 29, 2022 (IN) .............................. 202221049241

(51) Int. Cl.
*G06F 16/00* (2019.01)
*G06F 9/46* (2006.01)
*G06F 16/25* (2019.01)

(52) U.S. Cl.
CPC ................ *G06F 16/25* (2019.01); *G06F 9/46* (2013.01)

(58) Field of Classification Search
CPC ................................... G06F 16/25; G06F 9/46
See application file for complete search history.

(56) References Cited

U.S. PATENT DOCUMENTS

| | | | | |
|---|---|---|---|---|
| 8,516,548 B2* | 8/2013 | Lerner | ..................... | H04L 63/20 709/225 |
| 9,449,297 B2* | 9/2016 | Kasi | ....................... | H04L 69/329 |
| 2001/0044588 A1* | 11/2001 | Mault | ..................... | A61B 5/073 374/E1.004 |
| 2004/0046785 A1* | 3/2004 | Keller | .................... | G06F 9/5061 715/734 |
| 2004/0049365 A1* | 3/2004 | Keller | .................. | G06F 11/0709 714/E11.026 |
| 2004/0049565 A1* | 3/2004 | Keller | .................. | G06F 11/0709 714/E11.027 |

(Continued)

OTHER PUBLICATIONS

Search Report and Written Opinion of International Patent Application No. PCT/US2023/031354 dated Dec. 11, 2023, 10 pages.

(Continued)

*Primary Examiner* — Jared M Bibbee
(74) *Attorney, Agent, or Firm* — Jeffrey D. Frantz

(57) ABSTRACT

A dataset is received for ingestion into a data platform, and a correlation identifier is generated responsive to receiving the dataset. Multiple choreographed services emit multiple event messages. The plurality of choreographed services operate independently of each other based on a plurality of events triggered in a data platform. The plurality of events relate to contents of the dataset and comprising the correlation identifier. A message storage is populated with multiple status updates related to the correlation identifier. A status message associated with the correlation identifier is published in response to a status update of the plurality of status updates.

20 Claims, 8 Drawing Sheets

(56) References Cited

U.S. PATENT DOCUMENTS

| | | | | |
|---|---|---|---|---|
| 2014/0096109 | A1* | 4/2014 | Beno | G06F 8/20 |
| | | | | 717/120 |
| 2017/0187785 | A1* | 6/2017 | Johnson | H04L 51/42 |
| 2018/0219743 | A1* | 8/2018 | Garcia | H04L 41/0213 |
| 2019/0311152 | A1* | 10/2019 | Jacob | G06F 8/65 |
| 2021/0152500 | A1* | 5/2021 | Verbil | H04L 51/04 |
| 2022/0103439 | A1* | 3/2022 | Hutton | G06Q 10/0633 |
| 2022/0376980 | A1* | 11/2022 | Bhat | G06N 3/092 |
| 2023/0217277 | A1* | 7/2023 | Kumar | H04L 67/55 |
| | | | | 370/252 |

OTHER PUBLICATIONS

The Open Group, "ADR: Producing Status Message" posted by Paresh Behede, https://community.opengroup.org/osdu/platform/system/home/-/issues/80, Jan. 2022, 11 pages.

* cited by examiner

*300*

| Property | Description | Required | Data Type |
|---|---|---|---|
| Correlation ID | Unique GUID which gets created at the beginning of the workflow | True | String |
| DataSet ID | Unique ID to identify data set as highlighted above | True | String |
| DataSet ID Version | version of data set (if any) | False | String |
| DataSet Type | type of data set (file, file_collection, batch...) | True | ENUM |
| Record Count | • In case of file, it can be records inside file<br>• in case of file collection, it can be number of files<br>• in case of batch, it can be number of records | True | Int |
| Timestamp | Creation Timestamp | True | Timestamp |

| Property | Description | Required | Data Type | Indexed |
|---|---|---|---|---|
| Correlation ID | Unique GUID which gets created at the beginning of the workflow | True | String | True |
| Record ID | • Unique ID either of storage, workflow, etc<br>• This could be file record, entity record, schema record | True | String | True |
| Record ID Version | • In case of storage, it is storage record version<br>• in case of ingestion workflow, it is the workflow run ID | True | String | False |
| Stage | Current stage or activity | True | ENUM | True |
| Status | success/fail/in progress/skip/partial success | True | ENUM | True |
| Message | Status message | False | String | False |
| Error Code | 401/ 403/ 503... | False | Int | False |
| Additional Properties | Any additional properties sent by stage | False | String | False |
| Timestamp | Timestamp when status message publishes | True | Timestamp | True |

*FIG. 4*

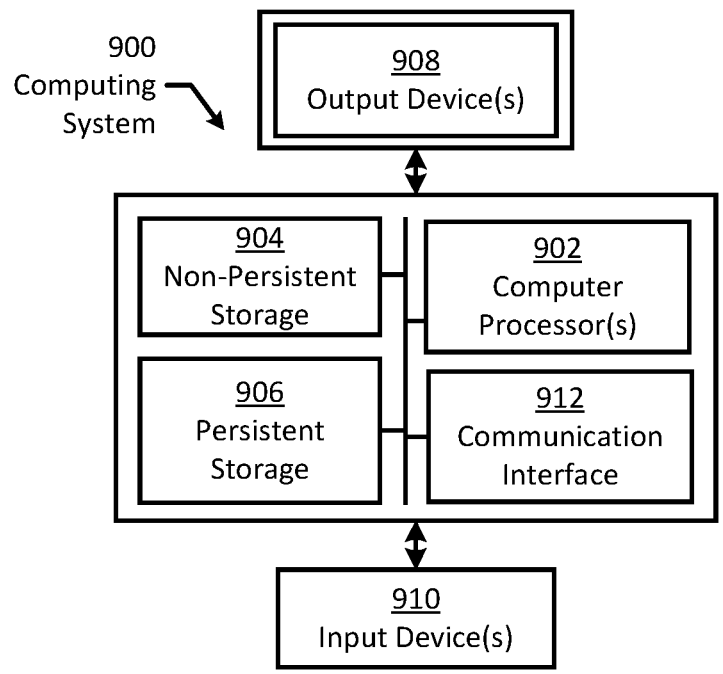
FIG. 9.1
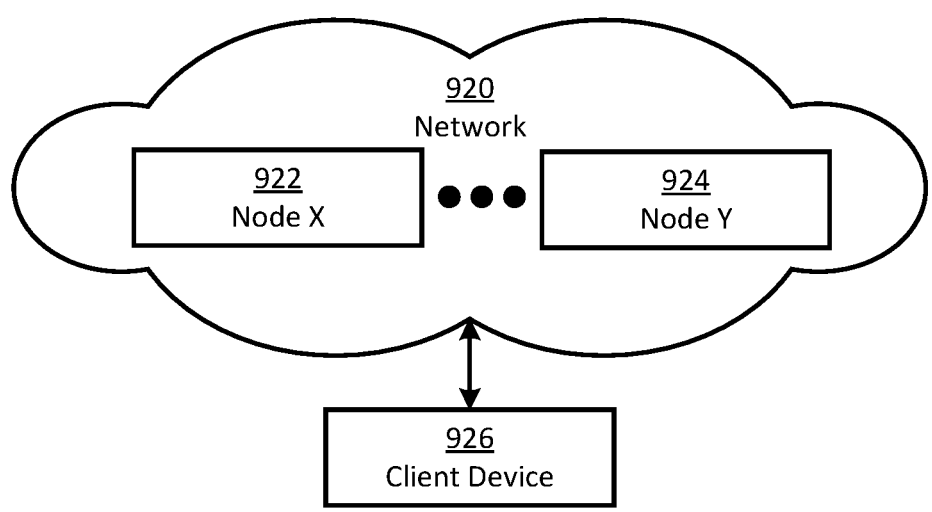
FIG. 9.2

US 11,983,187 B2

GLOBAL STATUS MONITORING FOR OPEN DATA PLATFORM

CROSS-REFERENCE TO RELATED APPLICATION

This application claims priority to Indian Patent Application No. IN 202221049241, which was filed on Aug. 29, 2022.

BACKGROUND

Data is often generated from a variety of sources for clients that need to remain privy to the operational aspects of their services. When data is not consistent or inaccessible, decisions made by such clients may not be the most well-informed, potentially resulting in operational inefficiencies as information wasn't accessible in a timely manner.

SUMMARY

In general, in one aspect, one or more embodiments related to a method that includes receiving a dataset, and generating a correlation identifier responsive to receiving the dataset. The method further includes listening for multiple event messages from multiple choreographed services, the plurality of choreographed services operating independently of each other based on a plurality of events triggered in a data platform, the plurality of events related to contents of the dataset and comprising the correlation identifier. The method further includes populating a message storage with multiple status updates related to the correlation identifier. A status message associated with the correlation identifier is published in response to a status update of the plurality of status updates.

Other aspects of the technology will be apparent from the following description and the appended claims.

BRIEF DESCRIPTION OF DRAWINGS

FIG. 3 shows a data contract in accordance with one or more embodiments.

FIG. 4 shows a data contract in accordance with one or more embodiments.

FIGS. 9.1 and 9.2 show a computing system in accordance with one or more embodiments.

DETAILED DESCRIPTION

Figure 1:
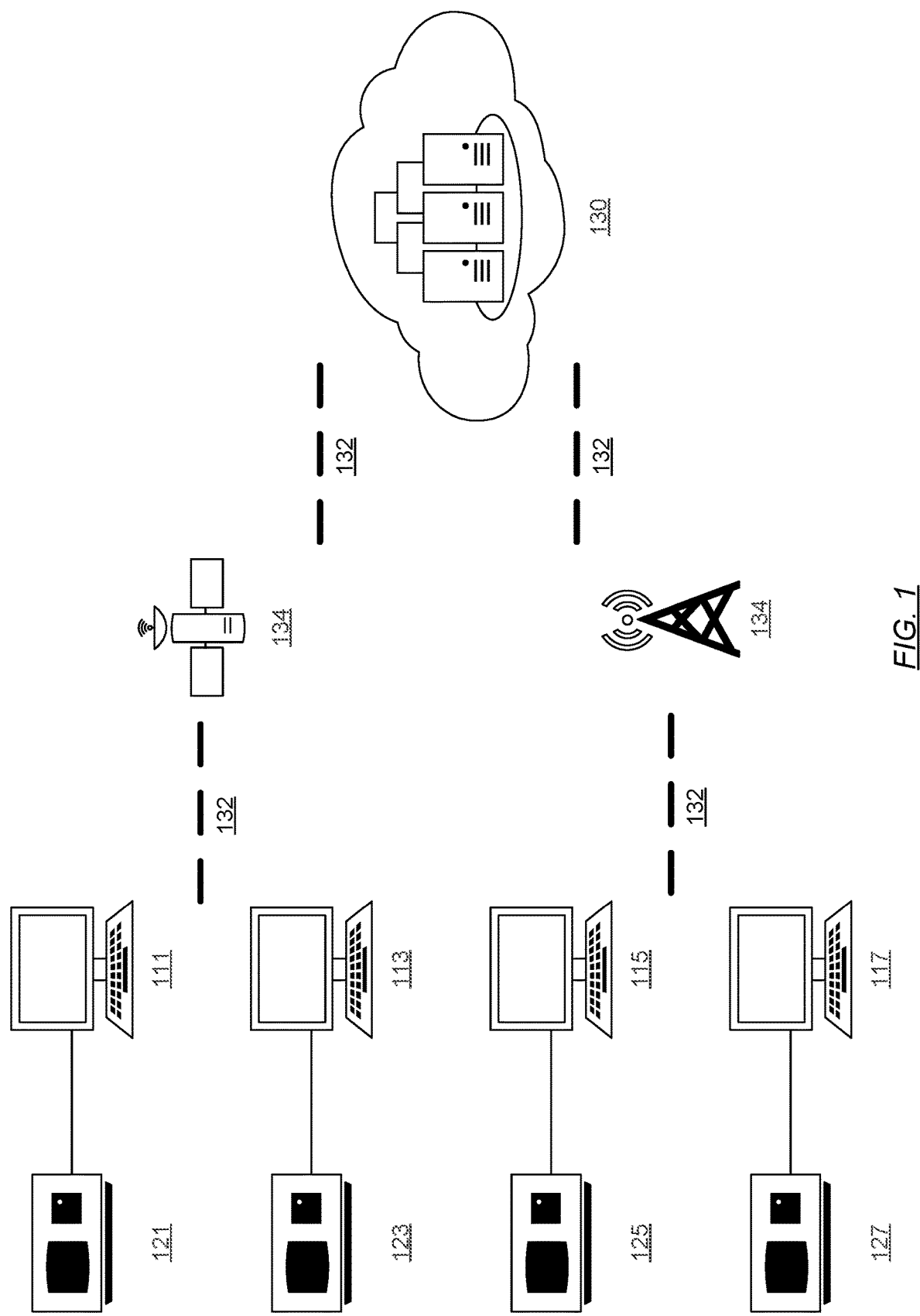
FIG. 1 depicts a schematic view of a cloud-based data sharing environment in which one or more embodiments may be implemented in which one or more embodiments may be implemented.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to be a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Components of a framework may be modeled as a set of Representational State Transfer (RESTful) services and include foundation services, development services, and data services. Various software applications use the services to perform business or domain operations. Software applications, both internal and external, has access to cloud foundation, development, and data services through an application programming interface (API) gateway. The foundation services, for example, target contract management, cloud security, traffic management, notifications, task management, and offers a portal for the framework. Development services offer a suite of services to run the framework as platform agnostic serverless cloud services, spin up virtual machines with preloaded software, and support three-dimensional (3D) data visualization. Data services offer data ingestion, consumption, management along with an automated data curation framework for software applications.

A problem exists is the lack of telemetry or insights in how data flowed through the system. For example, the data may be copied, transformed, used to create different data, which is then accessed by a variety of services as a part of a variety of independently operating workflows, etc. Because of the various transformations of the data, telemetry that tracks updates to a data object does not capture the overall data flow. Likewise, because multiple workflows and services may be involved, tracking a workflow does not capture the overall data flow.

The data management platform described herein provides a framework designed to help track the outcome (status) of data flowing throughout the system across various data stages, such as ingestion, standardization, data mastering, data quality, and indexing. Regardless of where data is flowing through the system, a workflow monitoring system captures pertinent service statuses that are published to the platform and persists these statuses for later consumption and downstream analysis, providing visibility and telemetry to data managers. In general, embodiments are directed to improving the accuracy and efficiency of a computer system when monitoring the status of a workflow through a system of choreographed services. One or more embodiments use a workflow monitoring system to monitor files ingested into the data platform and generate a correlation identifier in response to receiving a file. Rather than tracking changes to the file itself, the workflow monitoring system listens for event messages from multiple choreographed services. In one or more embodiments, the choreographed services operate independently of each other based on events triggered in a data platform, wherein the events relate to contents of the file and include the correlation identifier. The monitoring framework enables publishing, persistence and querying of status for a given workflow identified by correlation identifier. Services involved in a workflow publish statuses, which are collected, stored and can be queried upon.

FIG. 1 depicts a cloud-based data sharing environment in which one or more embodiments may be implemented. In one or more embodiments, one or more of the modules and elements shown in FIG. 1 may be omitted, repeated, and/or substituted. Accordingly, embodiments should not be considered limited to the specific arrangement of modules shown in FIG. 1.

As shown in FIG. 1, the data sharing environment includes remote systems (111), (113), (115), (117), data acquisition tools (121), (123), (125), (127), and a data platform (130) connected to the data acquisition tools (121), (123), (125), (127), through communication links (132) managed by a communication relay (134).

In one or more embodiments, data acquisition tools (121), (123), (125), are configured for collecting data. In particular, various data acquisition tools are adapted to measure and detect the physical properties of physical objects and structures. Other data may also be collected, such as historical data, analyst user inputs, economic information, and/or other measurement data and other parameters of interest.

In one or more embodiments, the remote systems (111), (113), (115), (117), are operatively coupled to the data acquisition tools (121), (123), (125), (127), and in particular, may configured to send commands to the data acquisition tools and to receive data therefrom. The remote systems (111), (113), (115), (117) may therefore be provided with computer facilities for receiving, storing, processing, and/or analyzing data from the data acquisition tools. in one or more embodiments, the remote systems may also be provided with, or have functionality for actuating, mechanisms of the data acquisition tools (121), (123), (125), (127). A data acquisition tool may be located in a physical location that differs from that of the remote system. As an example, a location may be, for example, a processing facility location, a data center location (e.g., server farm, etc.), an oil rig location, a wellsite location, a wind farm, a solar farm, etc. In one or more embodiments, the remote systems may then send command signals in response to data received, stored, processed, and/or analyzed, for example, to control and/or optimize various operations of the data acquisition tools.

In one or more embodiments, the remote systems (111), (113), (115), (117) are communicatively coupled to the data platform (130) via the communication links (132). In one or more embodiments, the communication between the remote systems and the data platform may be managed through a communication relay (134). For example, a satellite, tower antenna or any other type of communication relay may be used to gather data from multiple remote systems and transfer the data to a remote data platform for further analysis. In one or more embodiments, the data platform is an E&P system configured to analyze, model, control, optimize, or perform management tasks of E&P field operations based on the data provided from the remote systems. In one or more embodiments, the data platform (130) is provided with functionality for manipulating and analyzing the data. In one or more embodiments, the results generated by the data platform may be displayed for user to view the results in a two-dimensional (2D) display, three-dimensional (3D) display, or other suitable displays. Although the remote systems are shown as separate from the data platform in FIG. 1, in other examples, the remote systems and the data platform may also be combined.

In one or more embodiments, the data platform (130) is implemented by deploying applications in a cloud-based infrastructure. As an example, the applications may include a web application that is implemented and deployed on the cloud and is accessible from a browser. Users (e.g., external clients of third parties and internal clients of to the data platform) may log into the applications and execute the functionality provided by the applications to analyze and interpret data, including the data from the remote systems (111), (113), (115), (117). The data platform (130) may correspond to a computing system, such as the computing system shown in FIGS. 9.1 and 9.2 and described below.

Figure 2:
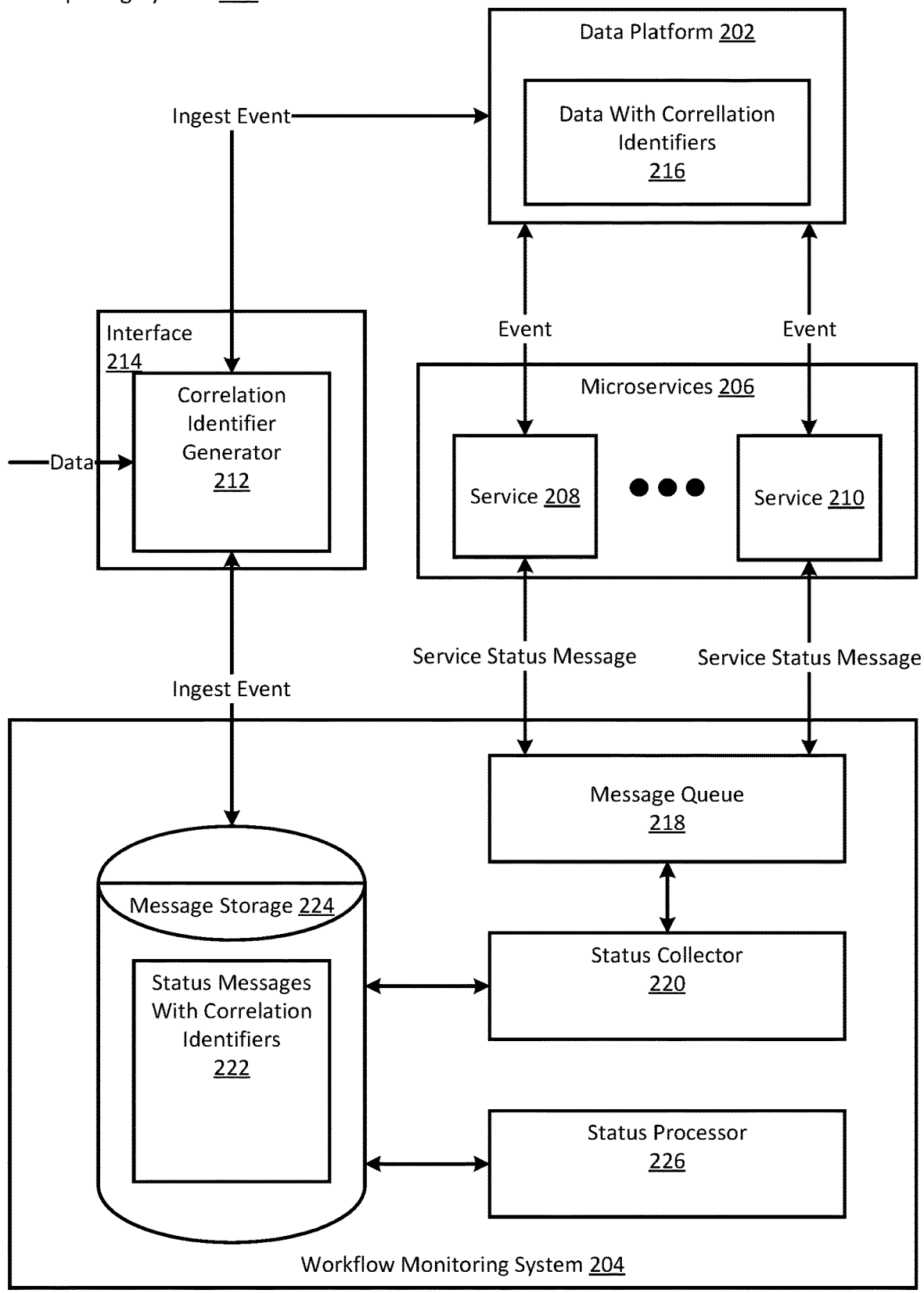
FIG. 2 shows a computer system in accordance with one or more embodiments.

FIG. 2 shows a computing system (200), which may be the same as a computing system of data platform (130) in FIG. 1. The hardware components of computing system (200) are described in further detail below and in FIGS. 9.1 and 9.2. The computing system includes a data platform (202), a workflow monitoring system (204), and a correlation identifier generator (212).

Data platform (202) is a standards-based data platform defined by a standard set of APIs and a standard set of data models for managing large, disconnected data sets in the platform. Data platform (202) can be a performant consumption layer for the data sources.

Workflow monitoring system (204) is a framework for tracking the outcome (status) of data flowing throughout the system across various data stages: ingestion, standardization, data mastering, data quality, indexing, and others. In one or more embodiments, workflow monitoring system (204) includes functionality for capturing events from microservices (206) and providing service status messages in real-time or near real-time as the services (208) and (210) of a workflow are performed.

In one or more examples, workflow monitoring system (204) integrates with applications and services deployed outside of data platform (202). For example, workflow monitoring system (204) may expose a set of RESTful APIs for publishing and consuming service status messages that are compliant with data platform (202) for each stage of a workflow.

The correlation identifier generator (212) includes functionality to generate correlation identifiers for data ingested into data platform (202). In one or more embodiments, correlation identifier generator (212) can be implemented as part of a file service for data platform (202). Correlation identifiers are globally unique identifiers (GUID) created at the beginning of a workflow according to a data contract for processing a specific dataset, including but not limited to a file, a collection of files, or a batch record.

In one or more embodiments, correlation identifier generator (212) can be implemented as part of an interface (214). Interface (214) can be an application programming interface (API) or a user interface through which data is received. When data is ingested, interface (214) communicates with correlation identifier generator (212) to form the data with correlation identifiers (216).

Microservices (206) perform ingestion and synchronization of the data from single or multiple data sources containing energy specific or other data sources. Collectively, microservices (206) form an extensible framework of services (208) and (210) that can be choreographed into multiple pipelines of multiple services that may be involved in the various data stages of data in data platform (202). For example, the data stages may include ingestion, standardization, data mastering, data quality, indexing, and others. While job-based data flows that include discrete sets of orchestrated tasks, microservices (206) are event-driven services. Namely, an event triggers the next microservice such that at least some of the microservices are not defined to operate in a particular order of other microservices. Further, microservices, along with executable instances of the microservices, may be added or removed from the system dynamically and without notification to other services. Thus, the choreographed data flows that are not predefined, but rather are runtime dynamic. Actions by microservices (206) produce events that can automatically trigger any number of downstream services.

In one or more embodiments, data with correlation identifiers (216) defines a context for events generated by microservices (206). The context describes the environment of the event, enabling status tracing as the actions of services (208), (210) are performed in a workflow.

Microservices (206) include functionality for generating service status messages. A service status message is a message transmitted to the workflow monitoring system (204) that includes the correlation identifier and a status of executing a service (208), (210). As opposed to tracking changes to the underlying data, service status messages provide a record of the execution status of services (208), (210) in a workflow. Service status messages are generated inside the services (208), (210) according to a defined data contract. Service status messages capture any errors and publish those errors to workflow monitoring system (204) in a human-readable format.

In one or more embodiments, workflow monitoring system (204) includes message queue (218). Message queue (218) may be implemented as a microservice, such as one of microservices (206), and subscribed to services (208), (210). Message queue (218) includes functionality for temporarily storing service status messages. For example, the message queue (218) may store the service status messages as a sequential collection of messages in a first-in-first-out (FIFO) data structure.

Status Collector (220) includes functionality to extract messages from message queue (218), to normalize the messages, and to store status messages with correlation identifiers (222) to message storage (224). Status Collector (220) may be implemented as a widget, or as a microservice, such as one of microservices (206) and subscribed to message queue (218).

In one or more embodiments, the message storage (224) is any type of storage unit and/or device (e.g., a file system, database, collection of tables, physical memory, or any other storage mechanism) for storing data. The storage of data may be permanent, semi-permanent, or temporary. Further, the message storage (224) may include multiple different storage units and/or devices. The multiple different storage units and/or devices may or may not be of the same type or located at the same physical site.

In one or more embodiments, workflow monitoring system (204) includes status processor (226). Status processor (226) exposes a set of endpoints for querying message storage (224) and includes functionality to filter status messages with correlation identifiers (222) according to types of events, service statuses, and individual microservices, such as service (208) and (210).

FIG. 3 depicts an example data contract specification (300) according to one or more illustrative embodiments. The data contract (300) of FIG. 3 is a collection of metadata that describes a particular data set for data ingestion into a data platform such as data platform (202). FIG. 3 shows the properties that are included in the data contract. Each row of FIG. 3 is for a particular property. For example, the first column is the property identifier of a property, the second column provides a description of the property, the third column indicates whether the property is required to be included in the data contract in the example, and the fourth column specifies the data type of the property. Taken together, the data contract that follows the data contract specification of FIG. 3 describes the particular data set.

The data contract of FIG. 3 is used to generate ingestion events when data is ingested into the data platform. In one or more embodiments, a JAVASCRIPT Object Notation (JSON) object is generated according to the data contract of FIG. 3. Downstream services may then reference the JSON to correlate events for an ingested data set.

FIG. 4 depicts a data contract specification (400) according to one or more illustrative embodiments. The data contract of FIG. 4 is a collection of metadata that describes a particular service status message. Microservices (206) generate service status messages according to and conforming with data contract of FIG. 4. In one or more embodiments, each service of a workflow generates a JSON object according to the data contract of FIG. 4. Services within a workflow emit status messages according to a same contract but having a different stage and status.

FIG. 4 shows the properties that are included in the data contract. Each row of FIG. 4 is for a particular property. For example, the first column is the identifier of a property, the second column provides a description of the property, the third column indicates whether the property is required to be included in the data contract in the example, the fourth column specifies the data type of the property, and the fifth column indicates whether the property is required to be indexed. Taken together, the data contract that follows the data contract specification of FIG. 4 describes the particular service status message.

Figure 5:
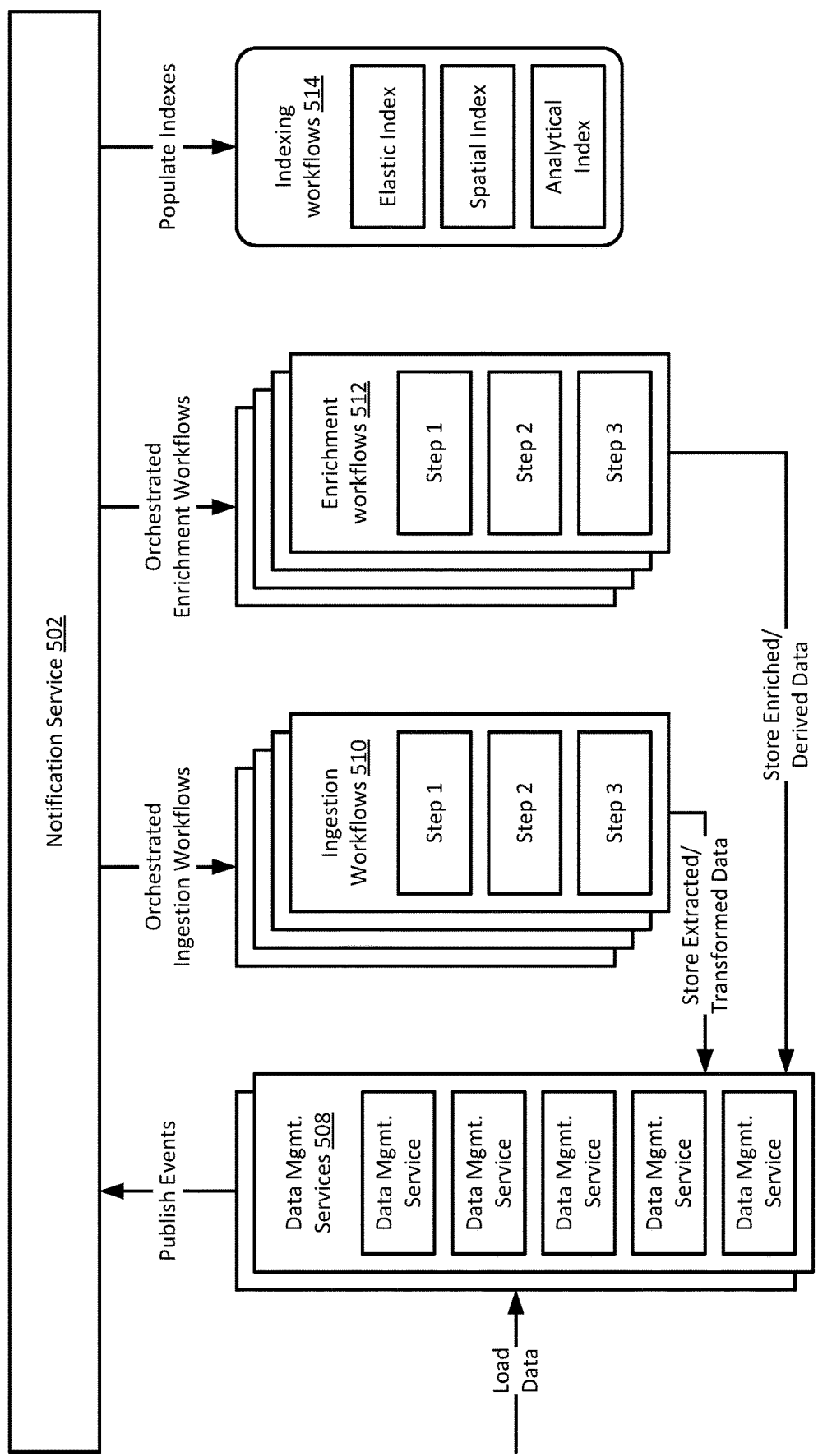
FIG. 5 shows a pipeline of a data contextualization in accordance with one or more embodiments.

FIG. 5 depicts a pipeline of a data contextualization workflow according to one or more illustrative embodiments. The data contextualization workflow of FIG. 5 can be implemented in the data platform (202) of FIG. 2.

In one or more embodiments, notification service (502) is a message bus that may utilize an asynchronous Publish/Subscribe architectural design pattern, or pub/sub, for exchanging messages. In a pub/sub model, the publisher is the entity that triggers or publishes the event. The subscriber is the entity receiving the notification of the event. Each published message is received by all microservices subscribing to the message. Data management services (508), as well as the microservices comprising workflows (510), (512), may act as publishers, subscribers, or both publishers and subscribers. Publishers and subscribers may be software applications, such as services applications. Alternatively, publishers and subscribers may be users.

When data is ingested, data management services (508) publish an event to notification service (502). The event can indicate the ingestion of new data, including but not limited to files, objects, reservoir data, and wellbore information. Furthermore, the event can indicate the storage of data by workflow, including but not limited to extracted/transformed data from ingestion workflows (510) and enriched/derived data from enrichment workflows (512).

Any subscriber can receive the event and react to the event. For example, the subscriber can be one of ingestion workflows (510), enrichment workflows (512), and indexing workflows (514). Each workflow may be internally orchestrated; however, the ordering and execution of the various workflows are choreographed based on, for example but not limited to, file metadata and upstream events. Thus, between workflows, services may execute in any order depending on the events triggered. Further, workflows may be added and removed from the system without notification to other workflows.

Each microservice within a workflow (illustrated as "steps") can consume and react to events published by other services. Each step of the workflow may publish their own status to the persistent storage, creating a record of every microservice that reacts to an event, as well as the status of processing by the microservice. Each of these services emits an event message conforming to a specific data contract, such as the data contract of FIG. 4.

The pipeline of FIG. 5 is an orchestrated system including multiple workflows that can be written and introduced by many different users at runtime. New workflows can hook into any event, creating an extensible system that can incorporate and react to platform-compliant events from both new and existing workflows as per the data model.

Figure 6:
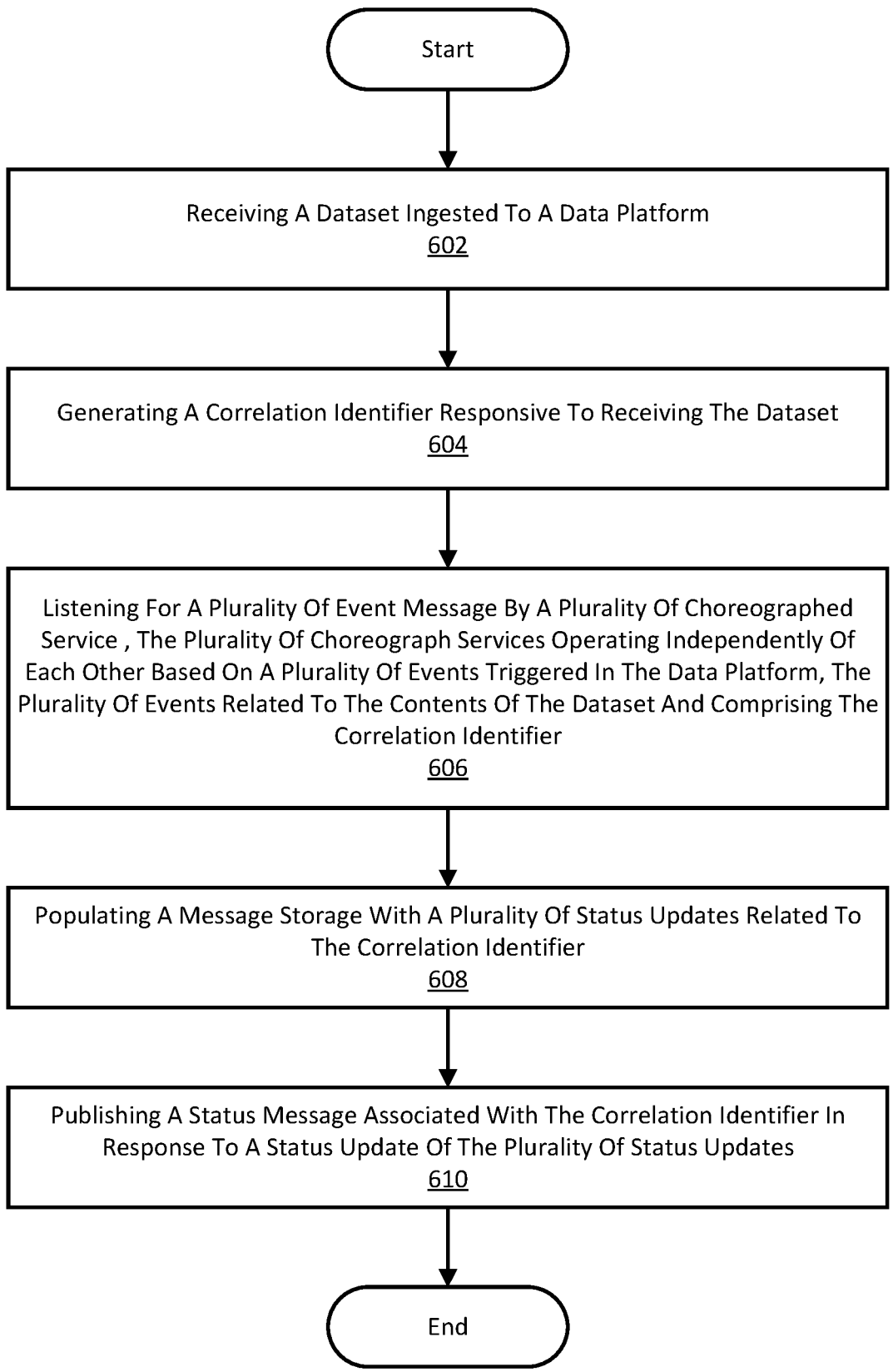
FIG. 6 shows a flowchart in accordance with one or more embodiments.

FIG. 6 shows a flowchart in accordance with one or more embodiments. One or more blocks shown in FIG. 6 may be combined, omitted, repeated, and/or performed in a different order among different embodiments. Accordingly, embodiments should not be considered limited to the specific number and arrangement of blocks shown in FIG. 6. FIG. 6 provides a general overview of one or more embodiments.

In block 602, a dataset is received for ingestion to a data platform in accordance with one or more embodiments. In one or more illustrative examples, the dataset can be received from an application deployed outside of the data platform. The application may access the data platform through a set of RESTful APIs.

In block 604, a correlation identifier is generated in response to receiving the dataset. In one or more illustrative examples, the correlation identifier may be generated as part of an ingestion event that is generated in response to ingesting the dataset. The ingestion event can be generated according to a data contract that is compliant with the data platform.

In block 606, multiple choreographed services listen for multiple event messages. The choreographed services operate independently of each other based on events triggered in the data platform. An event corresponds to a standard definition as used in the art. Specifically, an event is an action or occurrence that is recognized by a software and results in an event record. An event message is a record of the event that is transmitted to event listeners that listen for the particular type of event. The event message includes information about the event and a correlation identifier. Because the event message includes the correlation identifier, the correlation identifier follows the events that are triggered indirectly through the ingesting of the dataset even if entirely different data is used and created. Thus, actions of one microservice may correspond to events that trigger event messages to another microservice causing the next microservice to execute.

In block 608, a message storage is populated with multiple status updates related to the correlation identifier. Microservices registered to the system are configured to transmit status messages when the microservice performs particular actions. The status messages may match the format specified in FIG. 5. Because the event message includes the correlation identifier, when the microservice transmits the status message, the status message includes the correlation identifier associated with the event that caused the microservice to execute.

In block 610, a status message associated with the correlation identifier is published in response to a status update of the plurality of status updates. In one or more illustrative examples, publishing the status message may include storing the status message in a message queue. The status message may be published to a set of cloud services through a set of RESTful APIs.

In one or more illustrative examples, publishing the status message may include generating a push notification by a choreographed service. The push notification is in response to storing the status message in the message queue. The notification is then pushed to a subscriber to the message queue. In one or more illustrative examples, the framework enables the publishing and consumption of status events. These can be progressive updates for a workflow published in near real-time. The status messages are persisted in a message store and can be accessed through REST APIs to query the collective status for any workflow. For example, publishing the status message may include receiving a query of the plurality of status messages stored in the message storage. Status messages are pulled from the message storage in response to the query.

Figure 7:
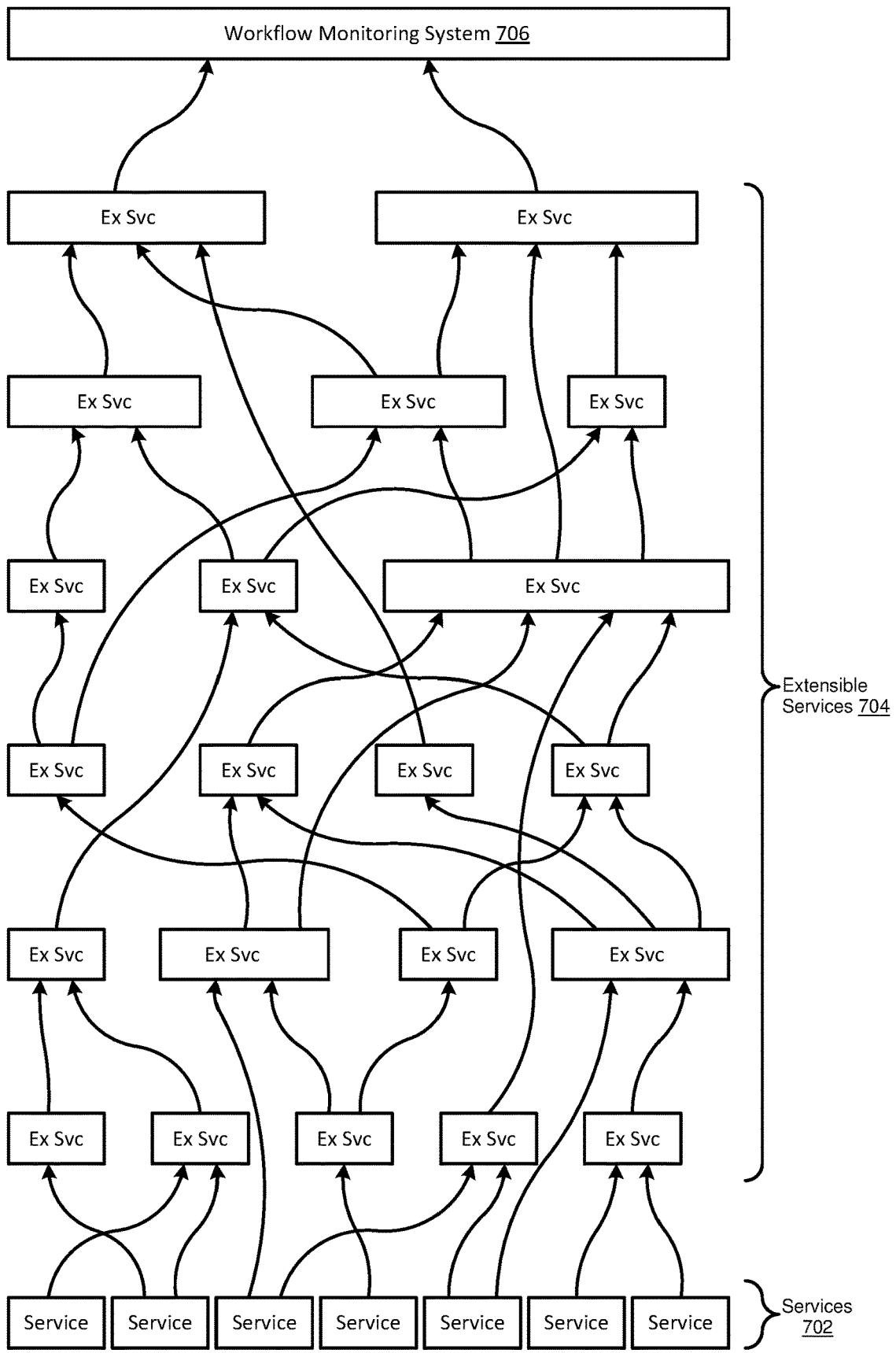
FIG. 7 shows a conceptual diagram in accordance with one or more embodiments.

FIG. 7 shows a conceptual diagram in accordance with one or more embodiments. Embodiments are not limited to the conceptual diagrams shown. Rather, the diagrams are for explanatory purposes. The example of FIG. 7 shows a simplified spaghetti diagram illustrating a possible interaction between services (702), extensible services (704), and workflow monitoring system (706).

The overall injection and enrichment workflow is choreographed, with each of extensible services (704) being choreographed to react to a specific event. Each of services (702) may provide a specific file type that may trigger a different choreographed workflow of extensible services (704). For example, an ingestion workflow may trigger when a specific file type is available for processing, etc. Which ingestion workflow gets triggered depends on the type of the event that is emitted from services (702). For example, a CSV injection, a shapefile injection, and a last file may each trigger a different workflow having different ones of extensible services reacting to the events that are generated. The steps are not predefined and some may be optional; extensible services (704) react only if a published event matches the service's subscriptions. In response, each extensible service (704) subscribing to the published event generates a status update, which is collected by workflow monitoring system (706).

For example, consider an ingestion of a CSV file containing ten data records for well data. One of services (702) uploads the CSV file, triggering a workflow service, which can be a first one of extensible services (704), and emitting a status event signaling that the workflow started. The status event is collected by workflow monitoring system (706).

The first service triggers a CSV ingestor service, a second one of extensible services (704), that parses the CSV file and creates storage records for each of the 10 data records in the CSV file. The CSV ingestor service emits a status events indicating that it ingested ten records. When created in storage, each of those ten records can automatically trigger a number of subsequent workflows, choreographed from extensible services (704), and emitting a number of subsequent status updates.

Continuing with the current example, each storage of a data record may trigger a search indexer service to index the raw data records, generating additional status messages. A Standardization/normalization service may trigger to convert the data record from a raw format into compliant with a data schema of the data platform, with each normalization of a data record triggering a separate status message. The normalized records are then stored and indexed according to additional composed workflows of extensible services (704). The normalized records may then be blended with data from other sources, creating additional data records that can be stored and indexed according to yet additional workflows.

In this example, the ingestion of just one file results in the generation of hundreds of status updates. Furthermore, because extensible services (704) are choreographed, any other service can be injected into the workflow, generating an additional set of statuses that get captured by workflow monitoring system (706).

Adding additional extensible services on top of those in the current example. understanding where data is within a pipeline and why processes are failing becomes exceedingly complex. Workflow monitoring system (706) solves this problem by attaching a correlation identifier to incoming data. Enforcing standardized data contracts, such as the data contracts of FIGS. 3 and 4, workflow monitoring system (706) percolates the correlation identifier through a composition of extensible services (704) and enables the indexing and association of service statuses.

Figure 8:
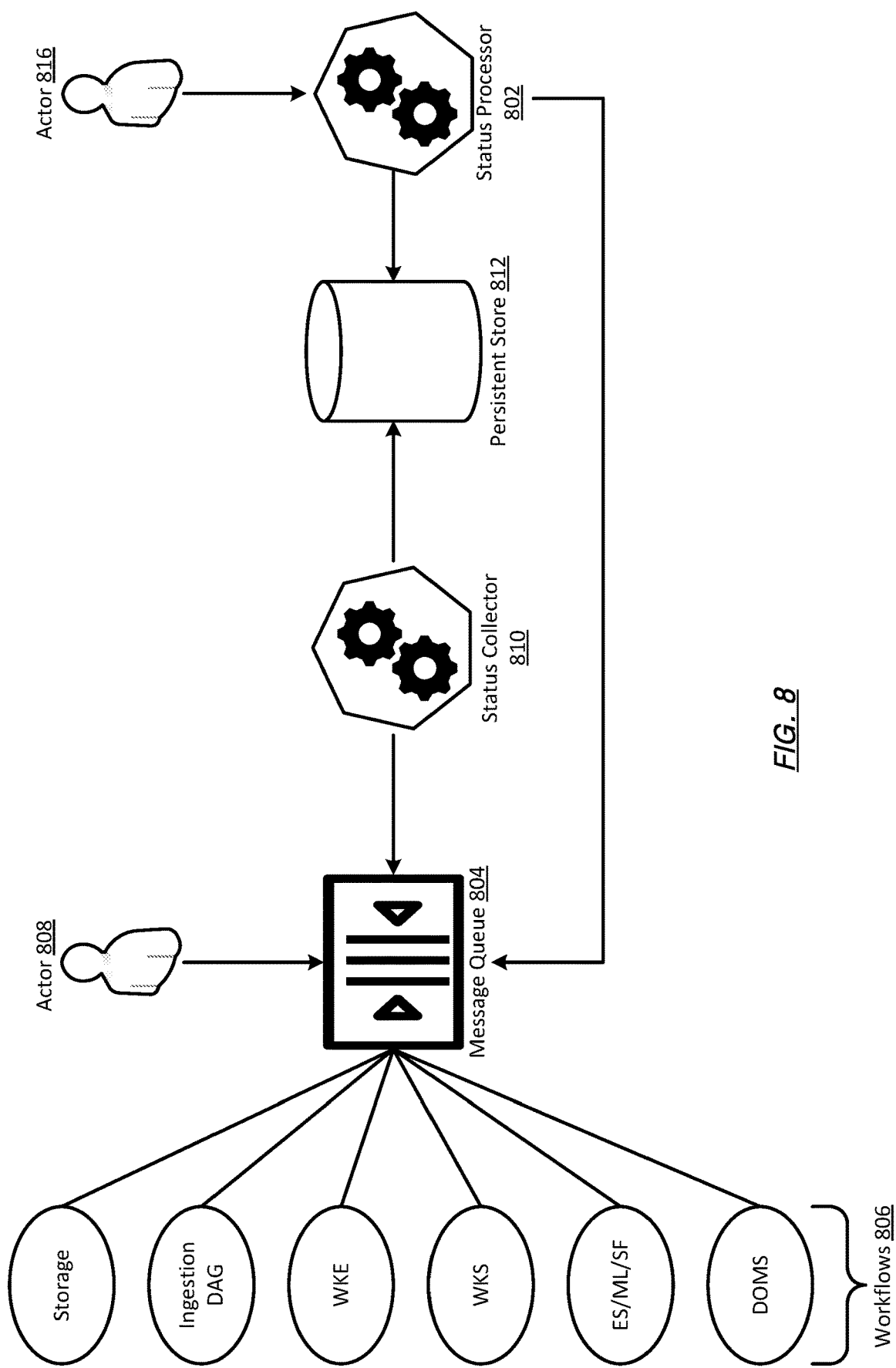
FIG. 8 shows a system according to one or more illustrative embodiments.

FIG. 8 is an illustration of a system according to one or more illustrative embodiments. The framework depicted in FIG. 8 uses Service Provider Interfaces to deploy the workflow monitoring system across various clouds while implementing cloud service provider-specific logic, where the core business logic remains the same. This cross-cloud publishing and consumption of status events, as an example, can be enabled by exposing a RESTful API for publishing and consuming status messages from message queue (804), and for querying of the persistent storage (812) by the status processor (802). The framework of FIG. 8 can provide real-time status updates in both PUSH and PULL formats, via Notifications, as well as real-time query capabilities via a query API.

In one illustrative embodiment, workflows (806) deposit status messages into a message queue (804). An interested consumer, such as actor (808), can receive a push notification in a real-time by directly subscribing to the message queue. Any service status message triggers a push notification to any party subscribing to the message queue. In one or more embodiments, the message queue (804) includes functionality to interface with adapters for delivery of messages to actor (808). The adapters are software applications that deliver messages including but not limited to email systems, widgets (e.g., notification widgets used in software applications), short messaging service (SMS) systems, or any other software application with messaging capabilities.

In one illustrative embodiment, status collector (810) pulls status messages from message queue (804) and stores messages into persistent store (812). Status processor (802) exposes a set of endpoints for querying persistent storage (812) and includes functionality to filter status messages with correlation identifiers (222) according to types of events, service statuses, and individual microservices, such as service (208) and (210). An interested consumer, such as actor (816) can query persistent storage (812) to pull status messages on demand, applying various filters to limit query results.

Embodiments may be implemented on a computing system. Any combination of mobile, desktop, server, router, switch, embedded device, or other types of hardware may be used. For example, as shown in FIG. 9.1, the computing system (900) may include one or more computer processors (902), non-persistent storage (904) (e.g., volatile memory, such as random access memory (RAM), cache memory), persistent storage (906) (e.g., a hard disk, an optical drive such as a compact disk (CD) drive or digital versatile disk (DVD) drive, a flash memory, etc.), a communication interface (912) (e.g., Bluetooth interface, infrared interface, network interface, optical interface, etc.), and numerous other elements and functionalities.

The computer processor(s) (902) may be an integrated circuit for processing instructions. For example, the computer processor(s) may be one or more cores or micro-cores of a processor. The computing system (900) may also include one or more input devices (910), such as a touchscreen, keyboard, mouse, microphone, touchpad, electronic pen, or any other type of input device.

The communication interface (912) may include an integrated circuit for connecting the computing system (900) to a network (not shown) (e.g., a local area network (LAN), a wide area network (WAN) such as the Internet, mobile network, or any other type of network) and/or to another device, such as another computing device.

Further, the computing system (900) may include one or more output devices (908), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (902), non-persistent storage (904), and persistent storage (906). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments.

The computing system (900) in FIG. 9.1 may be connected to or be a part of a network. For example, as shown in FIG. 9.2, the network (920) may include multiple nodes (e.g., node X (922), node Y (924)). Each node may correspond to a computing system, such as the computing system shown in FIG. 9.1, or a group of nodes combined may correspond to the computing system shown in FIG. 9.1. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (900) may be located at a remote location and connected to the other elements over a network.

Although not shown in FIG. 9.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (922), node Y (924)) in the network (920) may be configured to provide services for a client device (926). For example, the nodes may be part of a cloud computing system. The nodes may include functionality to receive requests from the client device (926) and transmit responses to the client device (926). The client device (926) may be a computing system, such as the computing system shown in FIG. 9.1. Further, the client device (926) may include and/or perform at least a portion of one or more embodiments.

The computing system or group of computing systems described in FIG. 9.1 and FIG. 9.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope. The processes may be part of the same or different application and may execute on the same or different computing system.

Rather than or in addition to sharing data between processes, the computing system performing one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments, may extract one or more data items from the obtained data. For example, the extraction may be performed as follows by the computing system in FIG. 9.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 9.1, while performing one or more embodiments, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments, A and B may be vectors, and comparing A with B involves comparing the first element of vector A with the first element of vector B, the second element of vector A with the second element of vector B, etc. In one or more embodiments, if A and B are strings, the binary values of the strings may be compared.

The computing system in FIG. 9.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 9.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents a few examples of functions performed by the computing system of FIG. 9.1 and the nodes and/or client device in FIG. 9.2. Other functions may be performed using one or more embodiments.

While one or more embodiments have been described with respect to a limited number of embodiments, those skilled in the art, having benefit of this disclosure, will appreciate that other embodiments may be devised which do not depart from the scope as disclosed herein. Accordingly, the scope should be limited by the attached claims.

What is claimed is:

1. A method comprising:
receiving a dataset ingested into a data platform, wherein the dataset relates to a wellsite, a reservoir, a wellbore, a wind farm, or a solar farm;
beginning a workflow and generating a correlation identifier in response to receiving the dataset, wherein the workflow comprises a plurality of choreographed services for processing the dataset;
listening for a plurality of event messages from the plurality of choreographed services of the workflow, the plurality of choreographed services operating independently of each other based on a plurality of events triggered in the data platform, the plurality of events related to contents of the dataset and comprising the correlation identifier;
populating a message storage with a plurality of status updates related to execution of the plurality of choreographed services of the workflow having the correlation identifier; and publishing a status message associated with the correlation identifier in response to each status update of the plurality of status updates to provide a status of the execution of the plurality of choreographed services of the workflow, wherein the listening, the populating, and the publishing track the workflow for processing the dataset without tracking changes to the dataset.

2. The method of claim 1, wherein receiving the dataset further comprises:
receiving the dataset from an application deployed outside of the data platform.

3. The method of claim 1, wherein generating the correlation identifier further comprises:
generating an ingestion event in response to ingesting the dataset, the ingestion event generated according to a data contract that is compliant with the data platform.

4. The method of claim 1, further comprising:
storing the status message in a message queue; and
publishing the status message to a set of cloud services through a set of Representational State Transfer (REST) application programming interfaces (APIs).

5. The method of claim 4, wherein publishing the status message further comprises:
generating a push notification by a choreographed service of the plurality of choreographed services, the push notification generated in response to storing the status message in the message queue; and
pushing the notification to an actor subscribed to the message queue.

6. The method of claim 4, further comprising:
receiving a query of the plurality of status messages stored in the message storage; and
pulling the status messages from the message storage in response to the query.

7. The method of claim 1, wherein the plurality of choreographed services are runtime dynamic, and publishing the status message occurs in real-time.

8. A workflow monitoring system in a data platform, comprising:
a correlation identifier generator configured to generate a correlation identifier at a beginning of a workflow and in response to receiving a dataset ingested into the data platform, wherein the dataset relates to a wellsite, a reservoir, a wellbore, a wind farm, or a solar farm, wherein the workflow comprises a plurality of choreographed services for processing the dataset;
an event listener configured to listen for a plurality of event messages from the plurality of choreographed services, the plurality of choreographed services operating independently of each other based on a plurality of events triggered in the data platform, the plurality of events related to contents of the dataset and comprising the correlation identifier;
a message storage configured to populate with a plurality of status updates related to execution of, generated by the plurality of choreographed services of the workflow having, the status updates related to the correlation identifier; and
a publisher configured to publish a status message associated with the correlation identifier in response to each status update of the plurality of status updates to provide a status of the execution of the plurality of choreographed services of the workflow, wherein the event listener, the message storage, and the publisher track the workflow for processing the dataset without tracking changes to the dataset.

9. A computer program product comprising non-transitory computer-readable program code that, when executed by a computer processor of a computing system, cause the computing system to perform a method of:
receiving a dataset ingested into a data platform, wherein the dataset relates to a wellsite, a reservoir, a wellbore, a wind farm, or a solar farm;
beginning a workflow and generating a correlation identifier in response to receiving the dataset, wherein the workflow comprises a plurality of choreographed services for processing the dataset;
listening for a plurality of event messages from the plurality of choreographed services of the workflow, the plurality of choreographed services operating independently of each other based on a plurality of events triggered in the data platform, the plurality of events related to contents of the dataset and comprising the correlation identifier;
populating a message storage with a plurality of status updates related to execution of the plurality of choreographed service of the workflow having the correlation identifier; and
publishing a status message associated with the correlation identifier in response to each status update of the plurality of status updates to provide a status of the execution of the plurality of choreographed services of the workflow, wherein the listening, the populating, and the publishing track the workflow for processing the dataset without tracking changes to the dataset.

10. The computer program product of claim 9, wherein receiving the dataset further comprises:
receiving the dataset from an application deployed outside of the data platform.

11. The computer program product of claim 9, wherein generating the correlation identifier further comprises:
generating an ingestion event in response to ingesting the dataset, the ingestion event generated according to a data contract that is compliant with the data platform.

12. The computer program product of claim 9, further comprising computer-readable program code that performs the method of:
storing the status message in a message queue; and
publishing the status message to a set of cloud services through a set of Representational State Transfer (REST) application programming interfaces (APIs).

13. The computer program product of claim 12, wherein publishing the status message further comprises:
generating a push notification by a choreographed service of the plurality of choreographed services, the push notification generated in response to storing the status message in the message queue; and
pushing the notification to an actor subscribed to the message queue.

14. The computer program product of claim 12, further comprising:
receiving a query of the plurality of status messages stored in the message storage; and
pulling the status messages from the message storage in response to the query.

15. A system comprising:
a computer processor;
memory; and
instructions stored in the memory and executable by the computer processor to cause the computer processor to perform operations, the operations comprising:

receiving a dataset ingested into a data platform, wherein the dataset relates to a wellsite, a reservoir, a wellbore, a wind farm, or a solar farm;

beginning a workflow and generating a correlation identifier in response to receiving the dataset, wherein the workflow comprises a plurality of choreographed services for processing the dataset;

listening for a plurality of event messages from the plurality of choreographed services of the workflow, the plurality of choreographed services operating independently of each other based on a plurality of events triggered in the data platform, the plurality of events related to contents of the dataset and comprising the correlation identifier;

populating a message storage with a plurality of status updates related to execution of the plurality of choreographed service of the workflow having the correlation identifier; and publishing a status message associated with the correlation identifier in response to each status update of the plurality of status updates to provide a status of the execution of the plurality of choreographed services of the workflow, wherein the listening, the populating, and the publishing track the workflow for processing the dataset without tracking changes to the dataset.

16. The system of claim 15, wherein receiving the dataset further comprises:

receiving the dataset from an application deployed outside of the data platform.

17. The system of claim 15, wherein generating the correlation identifier further comprises:

generating an ingestion event in response to ingesting the dataset, the ingestion event generated according to a data contract that is compliant with the data platform.

18. The system of claim 15, wherein the operations further comprise:

storing the status message in a message queue; and publishing the status message to a set of cloud services through a set of Representational State Transfer (REST) application programming interfaces (APIs).

19. The system of claim 18, wherein publishing the status message further comprises:

generating a push notification by a choreographed service of the plurality of choreographed services, the push notification generated in response to storing the status message in the message queue; and pushing the notification to an actor subscribed to the message queue.

20. The system of claim 18, further comprising:

receiving a query of the plurality of status messages stored in the message storage; and pulling the status messages from the message storage in response to the query.

* * * * *